US009652189B2

(12) United States Patent
Harada

(10) Patent No.: US 9,652,189 B2
(45) Date of Patent: \*May 16, 2017

(54) NON-TRANSITORY COMPUTER-READABLE STORAGE MEDIUM STORING PRINTER DRIVER CAUSING COMPUTING DEVICE TO PERFORM PROHIBITION PROCESSING, AND PRINT CONTROL METHOD OF THE PRINTER DRIVER

(71) Applicant: Konica Minolta, Inc., Tokyo (JP)

(72) Inventor: Yoshiyuki Harada, Tokyo (JP)

(73) Assignee: Konica Minolta, Inc., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 14/705,757

(22) Filed: May 6, 2015

(65) Prior Publication Data

US 2015/0324158 A1 Nov. 12, 2015

(30) Foreign Application Priority Data

May 8, 2014 (JP) .................................. 2014-096483

(51) Int. Cl.
*G06F 3/12* (2006.01)

(52) U.S. Cl.
CPC ............ *G06F 3/1276* (2013.01); *G06F 3/121* (2013.01); *G06F 3/1205* (2013.01);
(Continued)

(58) Field of Classification Search
CPC .... G06F 3/1204; G06F 3/1205; G06F 3/1207; G06F 3/1224; G06F 3/1232;
(Continued)

(56) References Cited

U.S. PATENT DOCUMENTS

| 2004/0021905 A1* | 2/2004 | Holmstead | ............ | G06F 3/1205 |
| | | | | 358/1.15 |
| 2006/0106775 A1* | 5/2006 | Kuhn | .................... | G06F 3/1204 |

(Continued)

FOREIGN PATENT DOCUMENTS

| JP | 2010-113623 A | 5/2010 |
| JP | 2012-030449 A | 2/2012 |

(Continued)

OTHER PUBLICATIONS

Office Action issued in corresponding Japanese Application No. 2014-096483 dated Aug. 30, 2016, and English translation thereof (10 pages).

*Primary Examiner* — Benny Q Tieu
*Assistant Examiner* — Juan M Guillermety
(74) *Attorney, Agent, or Firm* — Osha Liang LLP

(57) ABSTRACT

A non-transitory computer-readable storage medium storing a printer driver, when being executed by a processor of the computing device, causes a computing device to perform prohibition processing including: obtaining setup items associated with print features of the printer device and corresponding option values from PrintTicket, to create check data; checking the check data for a setup item causing a conflict between option values; and in response to finding a setup item causing a conflict between option values, replacing an option value in the PrintTicket, which is set for the setup item causing the conflict, with another option value.

19 Claims, 13 Drawing Sheets

(52) U.S. Cl.
CPC .......... G06F 3/1255 (2013.01); G06F 3/1258 (2013.01); H04N 2201/0094 (2013.01)

(58) Field of Classification Search
CPC .... G06F 3/1246; G06F 3/1253–3/1255; G06F 3/1276; G06F 3/1247; G06F 3/121; G06F 3/1258; H04N 2201/0094
USPC .............................................. 358/1.13, 1.15
See application file for complete search history.

(56) References Cited

U.S. PATENT DOCUMENTS

| | | | |
|---|---|---|---|
| 2009/0021782 A1* | 1/2009 | Morimoto | G06F 3/1204 358/1.15 |
| 2009/0046318 A1* | 2/2009 | Sakikawa | G06F 3/1255 358/1.15 |
| 2010/0118332 A1 | 5/2010 | Nakata | |
| 2011/0116131 A1* | 5/2011 | Mitsui | G06F 3/1255 358/1.15 |
| 2011/0222107 A1* | 9/2011 | Williams | G06F 3/1205 358/1.15 |
| 2012/0081720 A1* | 4/2012 | Pandit | G06F 3/1206 358/1.9 |
| 2012/0188575 A1* | 7/2012 | Young | G06F 3/1253 358/1.15 |
| 2013/0235402 A1* | 9/2013 | Yamamichi | G06F 3/1255 358/1.13 |
| 2013/0293924 A1* | 11/2013 | Armstrong | G06F 3/1255 358/1.15 |
| 2014/0293345 A1* | 10/2014 | Harada | G06F 3/1256 358/1.15 |
| 2015/0124276 A1* | 5/2015 | Harada | G06F 3/1205 358/1.13 |
| 2015/0124284 A1* | 5/2015 | Ward | G06F 3/1255 358/1.15 |
| 2015/0324157 A1* | 11/2015 | Harada | G06F 3/1255 358/1.15 |

FOREIGN PATENT DOCUMENTS

| | | |
|---|---|---|
| JP | 2012-226696 A | 11/2012 |
| JP | 2014-071573 A | 4/2014 |

* cited by examiner

FIG. 4

```
*GPDFileName:"v4xxx.GPD"
*GPDFileVersion:"1.0"
*GPDSpecVersion:"1.0"
*Include:    "msxpsinc.gpd"
*ModelName:   "v4xxx Driver"
*MasterUnits: PAIR(1200,1200)
*PrinterType: PAGE
*MaxCopies:   999

*Feature: Orientation
{
   *rcNameID: =ORIENTATION_DISPLAY
   *DefaultOption: PORTRAIT
   *Option: PORTRAIT
   {
      *rcNameID: =PORTRAIT_DISPLAY
   }
   *Option: LANDSCAPE_CC90
   {
      *rcNameID: LANDSCAPE_DISPLAY
   }
}
*Feature: PaperSize
{
   *rcNameID: =PAPER_SIZE_DISPLAY
   *DefaultOption: LETTER
   *Option: A4
   {
      *rcNameID: RCID_DMPAPER_SYSTEM_NAME
      *PrintableArea: PAIR(9520,13630)
      *PrintableOrigin: PAIR(200,200)
   }
   *Option: LETTER
   {
      *rcNameID: RCID_DMPAPER_SYSTEM_NAME
      *PrintableArea: PAIR(9800,12800)
      *PrintableOrigin: PAIR(200,200)
   }
}
*Feature: Stapling
{
    *rcNameID: =STAPLE_DISPLAY
    *DefaultOption: Off

*Option: Off
    {
       *rcNameID: =STAPLE_OFF_DISPLAY
    }

*Option: StapleTopLeft
    {
       *rcNameID: STAPLE_1LEFT_DISPLAY
    }
}
                    :
```

FIG. 7

```xml
<?xmlVersion="1.0" encording ="UTF-8"?>
<psf:PrintTicket xmlns:psf="http://..."xmlns:xsi="http://..."
xmlns:xsd="http://..."xmlns:ns0000="http://..."xmlns:psk="http://...">
  <psf:ParameterInit name="psk:JobCopiesAllDocuments">
    <psf:Value xsi:type="xsd:integer">1</psf:Value>
  </psf:ParameterInit>
  <psf:Feature name="psk:PageMediaSize">
    <psf:Option name="psk:ISOA3">
    </psf:Option>
  </psf:Feature>
  <psf:Feature name="psk:PageInputBin">
    <psf:Option name="ns0000:Tray4"/>
  </psf:Feature>
  <psf:Feature name="psk:DocumentStaple">
    <psf:Option name="psk:StapleDualLeft"/>
  </psf:Feature>

</psf:PrintTicket>>
```

FIG. 8

```xml
<?xmlVersion="1.0" encording ="UTF-8"?>
<psf:PrintTicket xmlns:psf="http://..."xmlns:xsi="http://..."
xmlns:xsd="http://..."xmlns:ns0000="http://..."xmlns:psk="http://...">
  <psf:ParameterInit name="psk:JobCopiesAllDocuments">
    <psf:Value xsi:type="xsd:integer">1</psf:Value>
  </psf:ParameterInit>
  <psf:Feature name="psk:PageMediaSize">
    <psf:Option name="ns0000:ISOA3">
    </psf:Option>
  </psf:Feature>
  <psf:Feature name="psk:PageInputBin">
    <psf:Option name="psk:AutoSelect"/>
  </psf:Feature>
  <psf:Feature name="psk:DocumentStaple">
    <psf:Option name="psk:None"/>
  </psf:Feature>

</psf:PrintTicket>>
```

PTHashcode = 1d43fe3c,4f3d274d

PTHashcode = 1d43fe3c,4f3d274d,6a5b341f

FIG. 11

| SETUP ITEM |
| --- |
| psk:JobCopiesAllDocuments |
| psk:PageMediaSize |
| psk:PageInputBin |
| psk:DocumentStaple |

FIG. 12

| SETUP ITEM | OPTION VALUE | CHANGED |
| --- | --- | --- |
| psk:JobCopiesAllDocuments | 1 | false |
| psk:PageMediaSize | psk:ISOA3 | false |
| psk:PageInputBin | ns0000:Tray4 | false |
| psk:DocumentStaple | psk:StapleDualLeft | false |

FIG. 13

| SETUP ITEM | OPTION VALUE | CHANGED |
| --- | --- | --- |
| psk:JobCopiesAllDocuments | 1 | false |
| psk:PageMediaSize | psk:ISOA3 | false |
| psk:PageInputBin | psk:AutoSelect | true |
| psk:DocumentStaple | psk:None | true |

FIG. 14

```
psk:PageMediaSize == psk:ISOA3 && psk:PageInputBin == ns0000:Tray4 -> psk:PageInputBin psk:AutoSelect
psk:PageMediaSize == psk:ISOA3 && psk:DocumentStaple == psk:StapleDualLeft -> psk:DocumentStaple psk:None
...
```

FIG. 15A

| DOCUMENT | TIME PERIOD OF PROCESSING UP TO COMPLETION OF PRINT DATA | | | PERIOD OF PROHIBITION PROCESSING TIME | | |
|---|---|---|---|---|---|---|
| | WITHOUT PROHIBITION PROCESSING CONTROL (sec) | WITH PROHIBITION PROCESSING CONTROL (sec) | REDUCTION RATE (%) | WITHOUT PROHIBITION PROCESSING CONTROL (sec) | WITH PROHIBITION PROCESSING CONTROL (sec) | REDUCTION RATE (%) |
| SP03P_AC.pdf | 13.58 | 10.9 | 19.73 | 9.18 | 6.5 | 29.19 |
| J9.doc | 9.53 | 7.83 | 17.84 | 4.58 | 2.88 | 37.12 |

FIG. 15B

| DOCUMENT | TIME PERIOD OF PROCESSING UP TO COMPLETION OF PRINT DATA | | | PERIOD OF PROHIBITION PROCESSING TIME | | |
|---|---|---|---|---|---|---|
| | WITHOUT PROHIBITION PROCESSING CONTROL (sec) | WITH PROHIBITION PROCESSING CONTROL (sec) | REDUCTION RATE (%) | WITHOUT PROHIBITION PROCESSING CONTROL (sec) | WITH PROHIBITION PROCESSING CONTROL (sec) | REDUCTION RATE (%) |
| SP03P_AC.pdf | 13.58 | 9.83 | 21.61 | 9.18 | 5.43 | 40.85 |
| J9.doc | 9.53 | 7.65 | 19.73 | 4.58 | 2.7 | 41.05 |

FIG. 15C

| DOCUMENT | TIME PERIOD OF PROCESSING UP TO COMPLETION OF PRINT DATA | | | PERIOD OF PROHIBITION PROCESSING TIME | | |
|---|---|---|---|---|---|---|
| | WITHOUT PROHIBITION PROCESSING CONTROL (sec) | WITH PROHIBITION PROCESSING CONTROL (sec) | REDUCTION RATE (%) | WITHOUT PROHIBITION PROCESSING CONTROL (sec) | WITH PROHIBITION PROCESSING CONTROL (sec) | REDUCTION RATE (%) |
| SP03P_AC.pdf | 13.58 | 8.15 | 39.99 | 9.18 | 3.75 | 59.15 |
| J9.doc | 9.53 | 6.67 | 30.01 | 4.58 | 1.72 | 62.45 |

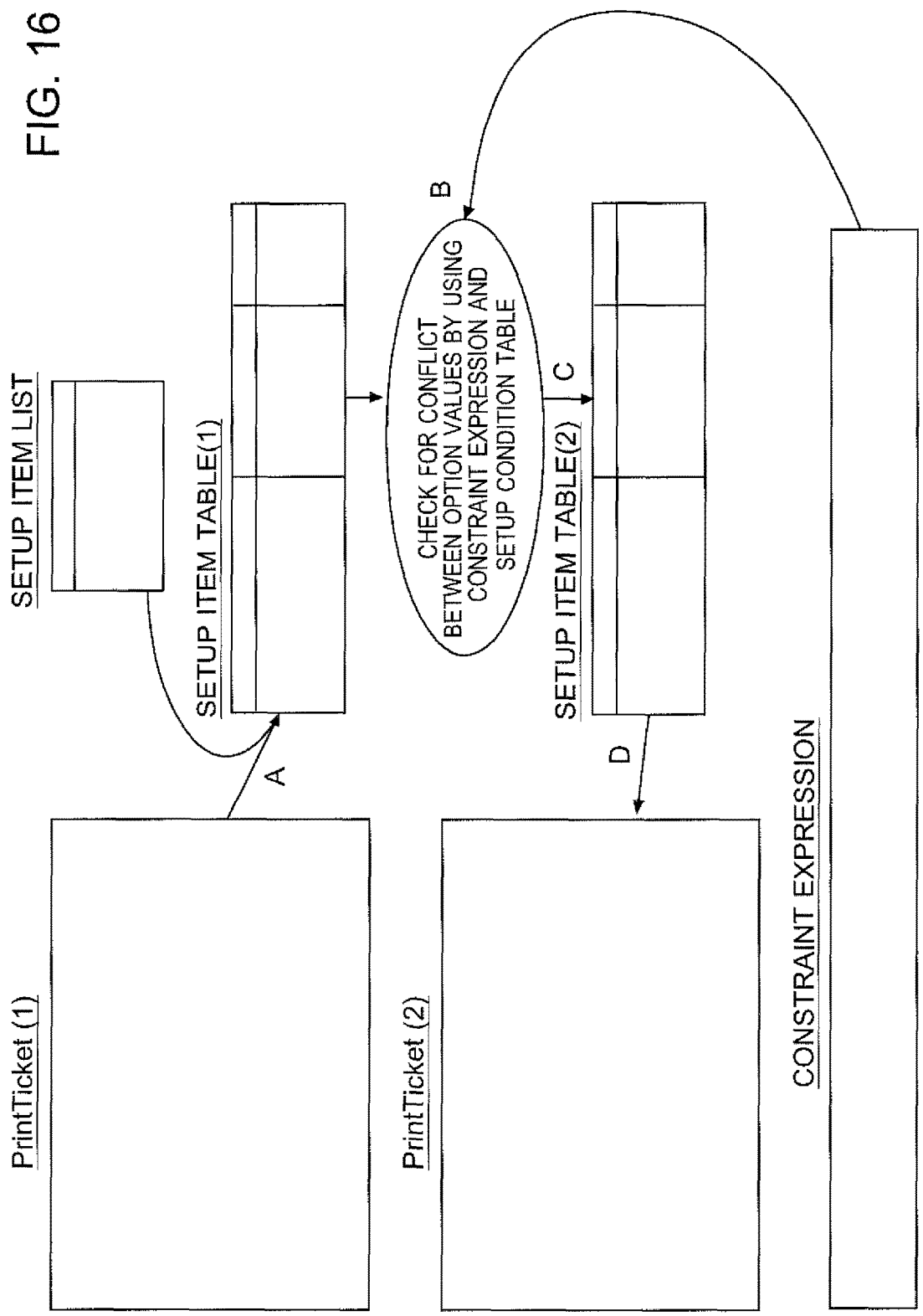

FIG. 17A
RELATED ART

```
<?xmlVersion="1.0" encording ="UTF-8"?>
<psf:PrintTicket xmlns:psf="http://..."xmlns:xsi="http://..."
xmlns:xsd="http://..."xmlns:ns0000="http://..."xmlns:psk="http://...">
  <psf:ParameterInit name="psk:JobCopiesAllDocuments">
    <psf:Value xsi:type="xsd:integer">1</psf:Value>
  </psf:ParameterInit>
  <psf:Feature name="psk:PageMediaSize">
    <psf:Option name="psk:ISOA3">
    </psf:Option>
  </psf:Feature>
  <psf:Feature name="psk:PageInputBin">
    <psf:Option name="ns0000:Tray4"/>
  </psf:Feature>
  <psf:Feature name="psk:DocumentStaple">
    <psf:Option name="psk:StapleDualLeft"/>
  </psf:Feature>

</psf:PrintTicket>>
```

FIG. 17B

| ParameterInit or Feature | Value or Option | Changed |
|---|---|---|
| psk:JobCopiesAllDocuments | 1 | false |
| psk:PageMediaSize | psk:ISOA3 | false |
| psk:PageInputBin | ns0000:Tray4 | false |
| psk:DocumentStaple | psk:StapleDualLeft | false | ized storage medium storing a printer driver therein and a print control method. In particular, the present invention relates to a non-transitory computer-readable storage medium storing a version 4 printer driver which is capable of running on Windows operating systems (WINDOWS is a registered trademark of Microsoft Corporation in the United States and other countries, and the same shall apply hereinafter) and a method of prohibition processing of the printer driver.

NON-TRANSITORY COMPUTER-READABLE STORAGE MEDIUM STORING PRINTER DRIVER CAUSING COMPUTING DEVICE TO PERFORM PROHIBITION PROCESSING, AND PRINT CONTROL METHOD OF THE PRINTER DRIVER

This application is based on Japanese Patent Application No. 2014-096483 filed on May 8, 2014, in the Japan Patent Office, the entire content of which is hereby incorporated by reference.

TECHNICAL FIELD

The present invention relates to a non-transitory computer-readable storage medium storing a printer driver therein and a print control method. In particular, the present invention relates to a non-transitory computer-readable storage medium storing a version 4 printer driver which is capable of running on Windows operating systems (WINDOWS is a registered trademark of Microsoft Corporation in the United States and other countries, and the same shall apply hereinafter) and a method of prohibition processing of the printer driver.

BACKGROUND

With regard to printer drivers which are capable of running on Windows operating systems, Microsoft corporation (MICROSOFT is a registered trademark of Microsoft Corporation in the United States and other countries, and the same shall apply hereinafter) provides guidelines for hardware manufacturers. According to the guidelines, hardware manufacturers have provided version 3 printer drivers on the assumption the printer drivers work with Windows operating systems from Windows 2000 to Windows 7.

As the succeeding operating systems, there arrived Windows 8 and Windows Server 2012. Especially, since Windows 8 employs a metro-style user interface, which is a new and tile-like user interface, hardware manufacturers are developing version 4 printer drivers which employ a new printer driver architecture for those operating systems.

Such a version 4 printer driver model has a structure roughly divided into two layers of a printer driver core component and a print setup UI (User Interface) component. These two layers are designed so as to separate their processes from each other, which realizes that the two layers can be provided separately.

The printer driver core component is an application which supplies print features. The printer driver core component causes, when being executed, a computing device to create print capability information referred to as PrintCapabilities and print setup information referred to as PrintTicket, on the basis of a data file like a GPD (Generic Printer Description) file including definition of print features, and to handle a conflict between settings associated with the print features.

The print setup UI component is an application being independent from the printer driver core component, and provides a setup user interface on the basis of PrintCapabilities and PrintTicket supplied from the printer driver core component.

For a purpose of executing print processing appropriately, such a printer driver, when being executed, causes a computing device to perform a process of checking an occurrence of a conflict between settings such as setup items and option values (referred to as prohibition processing). An increase of period of prohibition processing time delays a start time of print processing. In view of the problem, Japanese Unexamined Patent Publication (JP-A) No. 2012-226696 discloses a printer driver which causes a computing device to process information about print processing of a printer device. The printer driver includes a converting and storing module and an output module. The converting and storing module converts a structured data in which constraints about printing are described in a structured language into constraint data which is binary data in a multidimensional array, and makes a storage device to store the converted constraint data. The output module determines a constraint by using the constraint data stored and outputs a determined result. The conversion of the structured data into constraint data being binary data is conducted in order to increase the speed of the prohibition processing.

Though it takes relatively short time for the constraint prohibition in a version 3 printer driver, because a language such as C and C++ is used for the processing, the prohibition processing in a version 4 printer driver needs long time, because JavaScript (JAVASCRIPT is a registered trademark of Oracle America, Inc.) is used for the prohibition processing.

Concretely, in processing of a version 4 printer driver, a function referred to as validatePrintTicket( ) defined by JavaScript is invoked in response to receiving instructions of the prohibition processing form an application or an operating system. The function checks whether current option values described in the PrintTicket cause a conflict of option values. As a result of the check, if the option values include an option value causing such a conflict, the function solves the conflict, and returns information indicating whether a process to solve the conflict has been conducted, as a return value, to the application or the operating system. It takes long time for such processing.

The number of times the function validatePrintTicket( ) is invoked depends on the application and the operating system. The function can be invoked plural times for one process of printing, and instructions to perform the prohibition processing can be given several times for one and the same PrintTicket. Therefore, the time period needed for the prohibition processing using the function further increases by about five to ten times in comparison with the case that an equivalent processing is carried out by using a language such as C and C++. This situation newly arises from the feature of a version 4 printer driver. An increase of the prohibition processing delays a start time of print processing, which remarkably impairs the user's convenience.

SUMMARY

There are disclosed illustrative non-transitory computer-readable storage media each storing a printer driver and illustrative print control method of the printer driver.

An illustrative non-transitory computer-readable storage medium reflecting one aspect of the present invention stores a printer driver to be executed in a computing device which gives print instructions to a printer device. The printer driver, when being executed by a processor of the computing device, causing the computing device to perform prohibition processing comprising: obtaining setup items associated with print features of the printer device and option values set for the setup items from PrintTicket, to create check data by using the setup items and the option values. The prohibition processing further comprises checking the check data for a setup item causing a conflict between option values; and in response to finding a setup item causing a conflict between option values, replacing an option value in the PrintTicket, which is set for the setup item causing the conflict with the option values among the setup items in the PrintTicket, with another option value which does not cause a conflict between option values.

An illustrative method reflecting another aspect of the present invention is a print control method of a printer driver to be executed in a computing device which gives print instructions to a printer device. The printer driver, when being executed by a processor of the computing device, causes the computing device to perform prohibition processing. The method comprises: obtaining setup items associated with print features of the printer device and option values set for the setup items from PrintTicket, to create check data by using the setup items and the option values; checking the check data for a setup item causing a conflict between option values; and in response to finding a setup item causing a conflict between option values, replacing an option value in the PrintTicket, which is set for the setup item causing the conflict with the option values among the setup items in the PrintTicket, with another option value which does not cause a conflict between option values.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 4 illustrates an example of a GPD file relating to one embodiment of the present invention;

FIG. 7 illustrates an example of PrintTicket (PrintTicket (1) to be checked) relating to one embodiment of the present invention;

FIG. 8 illustrates an example of PrintTicket (PrintTicket (2) obtained after prohibiting processing is performed on PrintTicket (1)) relating to one embodiment of the present invention;

Figures 9A, 9B, 10A:
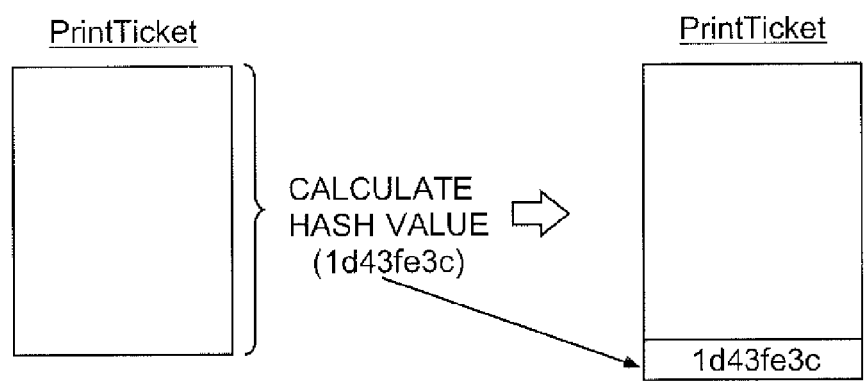
FIGS. 9A and 9B illustrate an example of a hash code table for use in prohibition processing relating to one embodiment of the present invention.
Figure 10B:
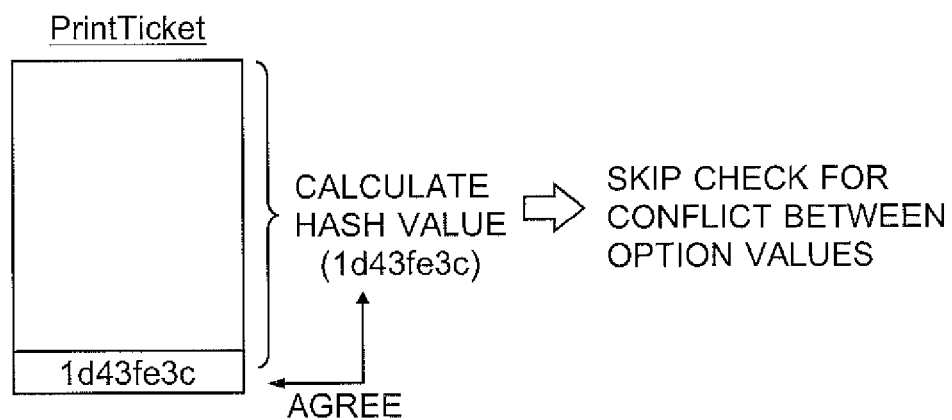
Figure 10C:
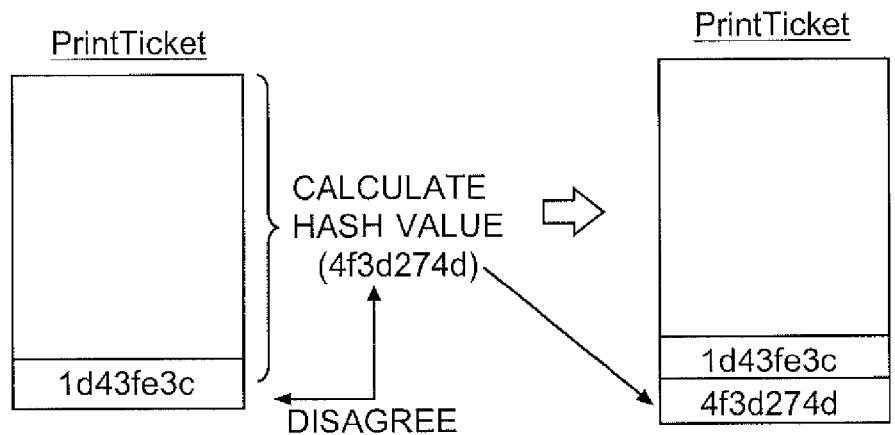

Each of FIGS. 10A to 10C illustrates an example of PrintTicket to which a hash value is added, for use in prohibition processing relating to one embodiment of the present invention;

FIG. 11 illustrates an example of a setup item list for use in prohibition processing relating to one embodiment of the present invention;

FIG. 12 illustrates an example of a setup condition table (a table prepared by adding option values before the prohibition processing is conducted to the setup items shown in FIG. 11) relating to one embodiment of the present invention;

FIG. 13 illustrates an example of a setup condition table (a table prepared by adding option values after the prohibition processing has been conducted to the setup items shown in FIG. 11) relating to one embodiment of the present invention;

FIG. 14 illustrates an example of a constraint expression for use in prohibition processing relating to one embodiment of the present invention;

FIGS. 15A, 15B and 15C are diagrams for illustrating effects of various types of controls of the prohibition processing relating to one embodiment of the present invention, FIG. 15A illustrates effects obtained when comparison of hash values is conducted in the prohibition processing, FIG. 15B illustrates effects obtained when the prohibition processing is conducted by using a setup condition table, and FIG. 15C illustrates effects obtained when the processing of FIG. 15A and the processing 15B are conducted;

FIG. 16 is a diagram schematically illustrating prohibition processing relating to one embodiment of the present invention; and FIGS. 17A and 17B are diagrams for comparing the prohibition processing relating to one embodiment of the present invention and conventional prohibition processing.

DETAILED DESCRIPTION

Illustrative embodiments of non-transitory computer-readable storage media each storing a printer driver and print control methods of the printer driver will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the non-transitory computer-readable storage media each storing a printer driver and print control methods of the printer driver as the illustrative embodiments, prohibition processing which includes a process of checking for a conflict between option values associated with print features can be carried out efficiently, because of the following reason.

The printer driver (JavaScript constraint section), when being executed by a processor of the computing device, causes a computing device to perform the following prohibition processing. The processing includes reading setup items associated with print features of a printer device and corresponding option values from PrintTicket to be checked, and creating check data by using the setup items and the option values. The processing further includes checking the check data for an occurrence of a conflict between option values; and in response to finding the occurrence of the conflict, replacing an option value in the PrintTicket, which is set for the setup item causing the conflict, with another option value which does not cause a conflict between option values. In concrete terms, in the process of checking the check data for an occurrence of a conflict between option values, an option value in the check data, which is set for the setup item causing the conflict, is replaced with another option value which does not cause a conflict between option values, and information indicating that the option value has been replaced is added to the check data. Then, in the process of replacing the option value in the PrintTicket, the option value in the PrintTicket, which is set for the setup item causing the conflict, is replaced with the option value in the check data which does not cause a conflict between option values.

The above-described processing makes a process of reading PrintTicket, which is relatively large in data size, for each of constraint expressions, unnecessary. Therefore, even under the condition that the prohibition processing is carried out by using a script language like JavaScript, the period of the prohibition processing can be shortened and thereby the time until a start time of print processing can be shortened.

As illustrated in the descriptions about the background, hardware manufactures provide printer drivers for Windows operating systems and are further developing version 4 printer drivers for new Windows operating systems such as Windows 8 and Windows Server 2012.

Such a version 4 printer driver is needed to use a script language, such as JavaScript, for prohibition processing, and it takes longer time for such the prohibition processing in comparison with a case that an equivalent processing is carried out by using a language such as C or C++. In special, the function validatePrintTicket( ) can be invoked plural times for one process of printing, and a cheek for a conflict between option values is conducted plural times for one and the same PrintTicket. As a result, the period of time needed for the prohibition processing increases, and a start time of print processing delays.

This tendency is described on the basis of measured data. Table 1 shows periods of processing time from time of a user's operation to press a print button on a print setup screen to time when a creation of print data has been completed. The periods of the processing time in the table are average values obtained by measuring the above-described period of processing time five times in each of a condition that the processing uses prohibition processing and a condition that the processing does not use prohibition processing, and calculating an average of the measured values. There are two kinds of test data as measurement targets, document "SPO3P_AC.pdf" composed of one page and document "J9.doc" composed of five pages. As the measurement environment, Windows 8 Pro, Intel Core i5-2400 CPU 3.10 GHz (INTEL CORE is a registered trademark of Intel Corporation), 8.00 GB memory, and 400 GB (remaining 100 GB) HDD were used; and the documents were processed by using applications, Adobe Reader 11.0.3 (ADOBE and READER are either registered trademarks of Adobe Systems) and Microsoft Word 2010.

TABLE 1

| Document | With prohibition processing (sec) | Without prohibition processing (sec) | Period of prohibition processing time (sec) | Ratio of period of prohibition processing time (%) |
| --- | --- | --- | --- | --- |
| SP03P_AC.pdf | 13.58 | 4.4 | 9.18 | 67.6 |
| J9.doc | 9.53 | 4.95 | 4.58 | 48.06 |

In Table 1, the period of prohibition processing time was obtained by calculating a difference of the measurement time in the case that the prohibition processing has been carried out and the measurement time in the case that the prohibition processing has not been carried out. As shown in Table 1, each of the periods of prohibition processing time obtained for the two kinds of test data is in the range of about 45% to about 70% of the period of the processing time until the time when the creation of print data has been completed, measured under the condition that the processing uses prohibition processing. That is, the ratio of the period of the prohibition processing time to the period of print processing is very large. Therefore, it is important to shorten the period of prohibition processing time, in order to carry out print processing rapidly.

As for the issue, a conventional version 3 printer driver uses C or C++ for prohibition processing and the prohibition processing is completed in less than one second. Therefore, the period of the prohibition processing did not matter. On the other hand, a version 4 printer driver uses a script language, such as JavaScript, for prohibition processing and it increases the prohibition processing time. In particular, it has been ascertained that an operating system and an application give instructions to execute prohibition processing many times during processing of one and the same PrintTicket. Performing prohibition processing many times on the same PrintTicket furthermore increases the prohibition processing time. Therefore, there is a demand to shorten the prohibition processing time.

In view of that, the present inventor has focused on the fact that, in a process of checking for a conflict of option values and/or option items by using constraint expressions, reading PrintTicket, which is relatively large in data size, for each constraint expression is a chief factor of an increase of the prohibition processing time, and has provided the following printer driver as one embodiment of the present invention. The printer driver uses a script language, such as JavaScript, for prohibition processing. The printer driver causes, when being executed, a computing device to read setup items and corresponding option values from PrintTicket described in a structured language like XML (Extensible Markup Language); create check data which is small in data size; check the check data for invalid settings such as a setup item causing a conflict between the option values; and replace an option value in the PrintTicket, which is set for a setup item causing the conflict, with another option value. Concretely, the printer driver, when being executed, causes a computing device to read the check data for each of constraint expressions; check the check data for a conflict between option values; replace an option value in the check data, which is set for a setup item which causes the conflict, with an option value which does not cause a conflict with other option values; and add information indicating that the option value has been replaced, into the check data. Then, when the check process has been completed, the printer driver causes the computing device to refer to the information added to the check data; define the setup item which causes the conflict; and replace the option value in PrintTicket, which is set for the setup item concerned, with the option value in the check data.

Effects which can be obtained by carrying out the above-described control in prohibition processing will be descried. FIGS. 17A and 17B are diagrams for comparing a conventional method to read PrintTicket for prohibition processing and a conventional to read a table for prohibition processing as one embodiment of the present invention. FIG. 17A illustrates PrintTicket for showing a conventional way to read the PrintTicket for prohibition processing. The conventional way needs a process to read setup items and corresponding setup option values from PrintTicket which is relatively large in data size, and a part of the PrintTicket, which is not used for the check for a complicit of option values is needed to be read. Since such processing is carried out for each of constraint expressions, it elongates the total processing time. On the other hand, FIG. 17B illustrates a table for showing a way to use the table for prohibition processing, employed in one embodiment of the present invention. According to the illustrated way in FIG. 17B, the prohibition processing can be carried out by reading just setup items and corresponding option values which are necessary for the check of a conflict of option values from check data (the illustrated table) which is relatively smaller in data size than PrintTicket. It reduces the processing time greatly. In special, a use of check data described in a text format, rather than a XML format, reduces the size of check data and makes the process of reading the check data easier, which furthermore reduces the processing time.

The effects will be described on the basis of measurement values. Table 2 shows periods of processing time from time of a user's operation to press a print button on a print setup screen to time when a creation of print data has been completed. The periods of the processing time in the table are average values obtained by measuring the above-described period of processing time five times in each of a condition that the processing uses the above-described control of prohibition processing and a condition that the processing does not use the above-described control of prohibition processing, and calculating an average of the measured values.

TABLE 2

| Document | Without applying prohibition processing control (sec) | With applying prohibition processing control (sec) | Reduction rate (%) |
|---|---|---|---|
| | Time period of processing up to completion of print data | | |
| SP03P_AC.pdf | 13.58 | 9.83 | 27.61 |
| J9.doc | 9.53 | 7.65 | 19.73 |
| | Period of prohibition processing time | | |
| SP03P_AC.pdf | 9.18 | 5.43 | 40.85 |
| J9.doc | 4.58 | 2.7 | 41.05 |

As shown in Table 2, applying the above-described control of the prohibition processing can reduce the time period of the processing up to the time of when the creation of print data has been completed by about 20% to about 30%, and can reduce the period of prohibition processing time by about 40%. A reduction of the period of processing time up to the time of completion of print data creation can improve the performance of a printer driver.

EXAMPLE

Figure 1:
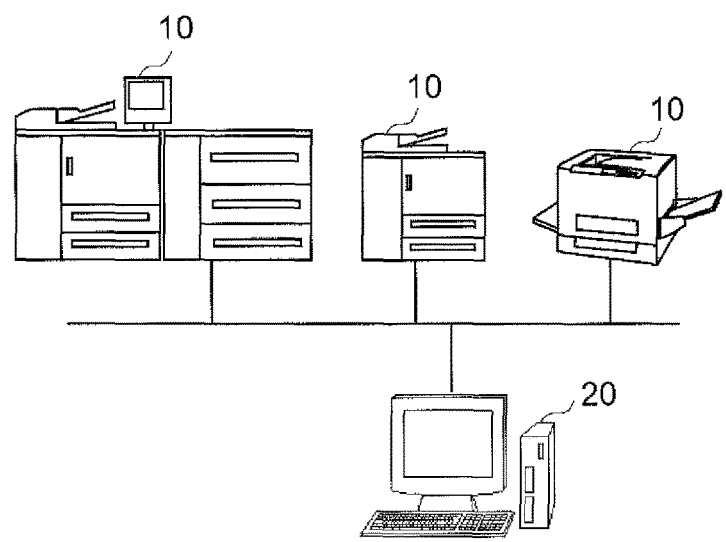
FIG. 1 is a diagram schematically illustrating a constitution of a printing system relating to one embodiment of the present invention.
Figure 2:
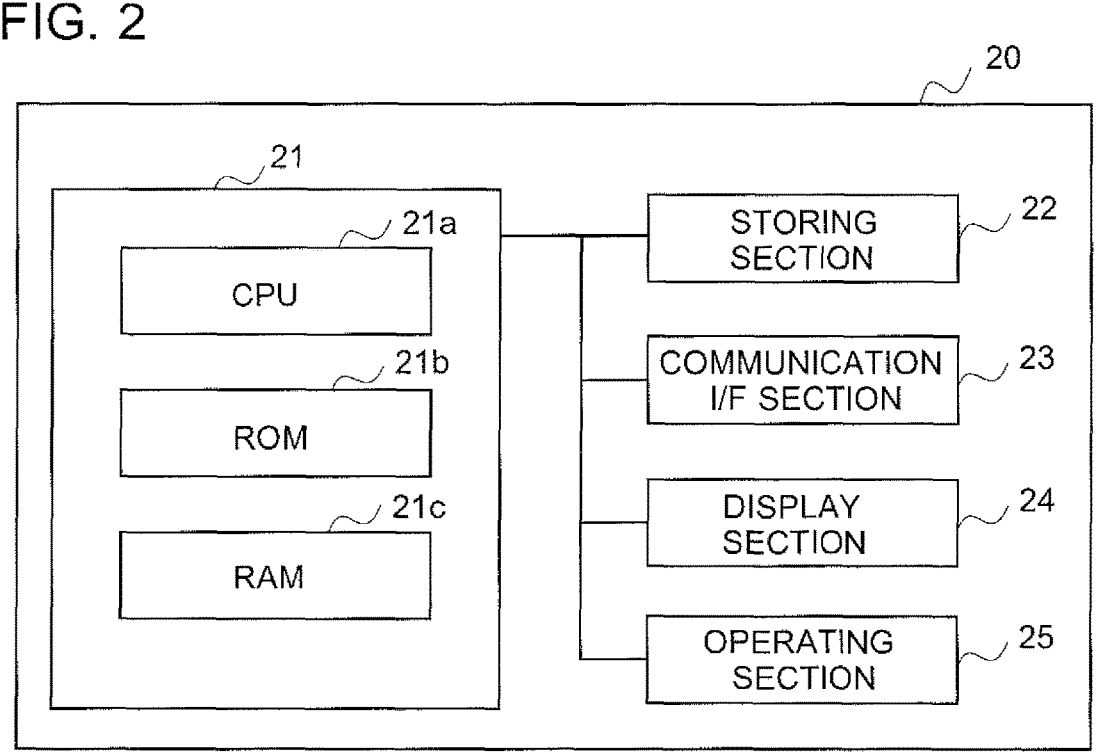
FIG. 2 is a block diagram illustrating a constitution of a computing device relating to one embodiment of the present invention.
Figure 3:
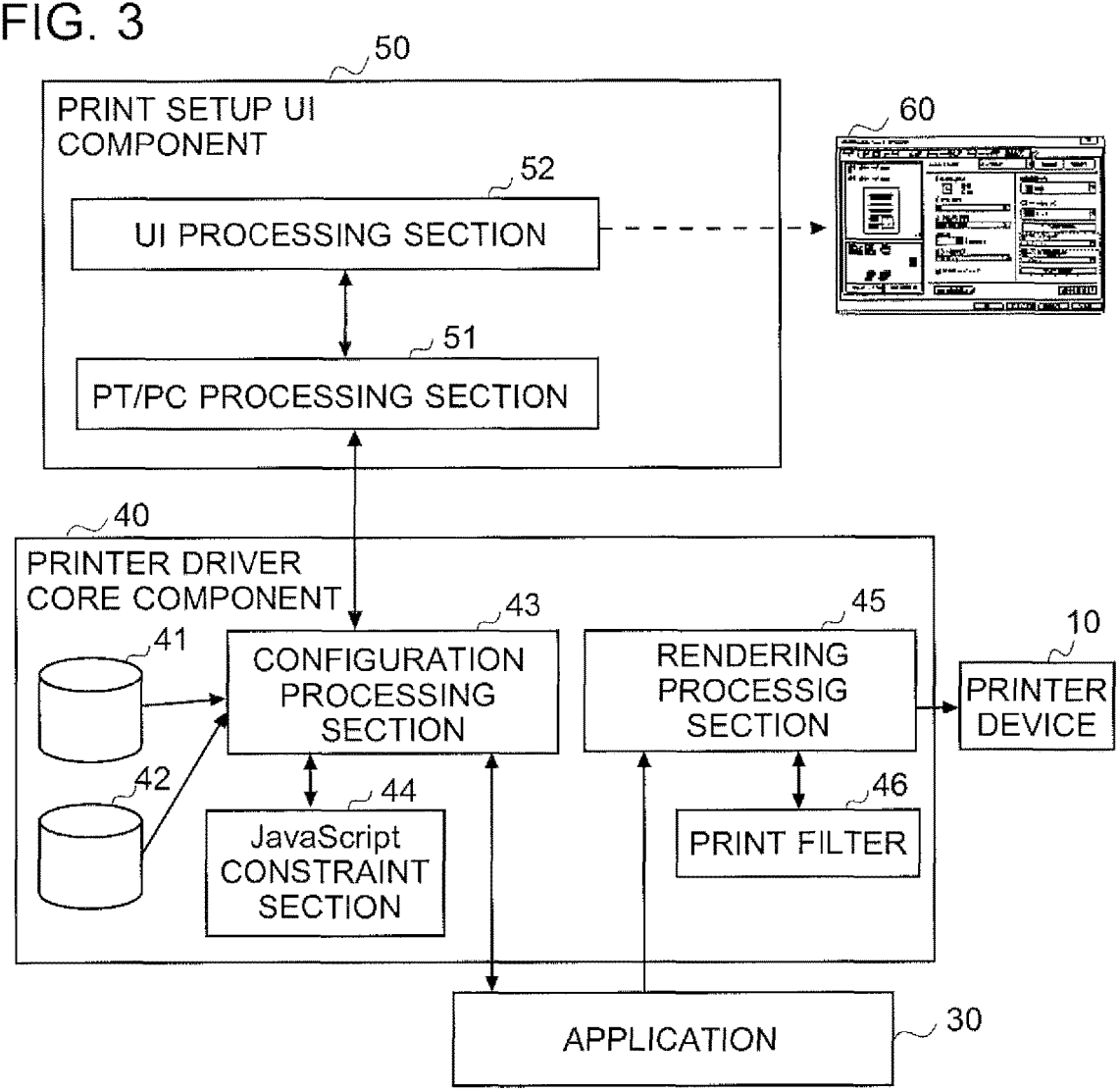
FIG. 3 is a functional block diagram of a computing device relating to one embodiment of the present invention.
Figure 5:
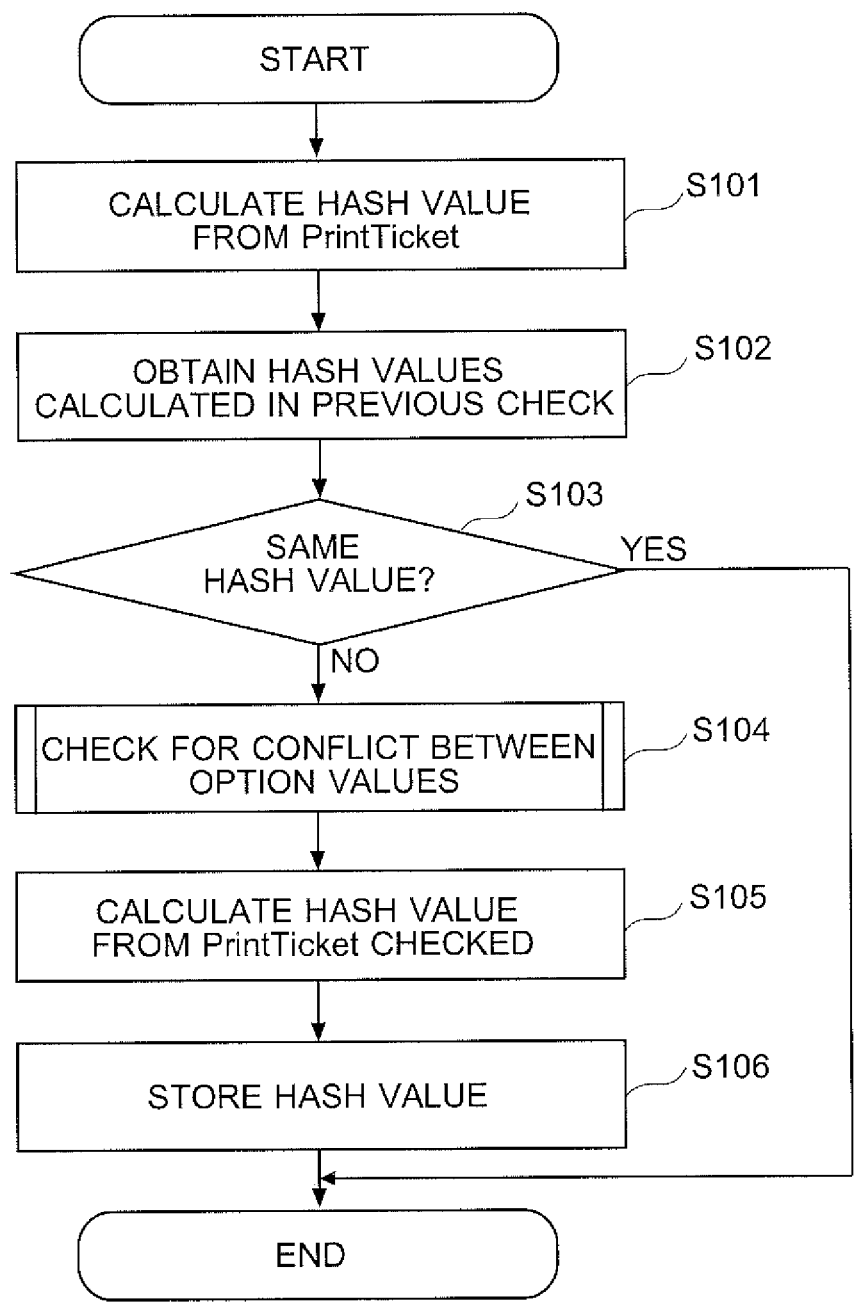
FIG. 5 is a flowchart illustrating prohibition processing of a computing device relating to one embodiment of the present invention.
Figure 6:
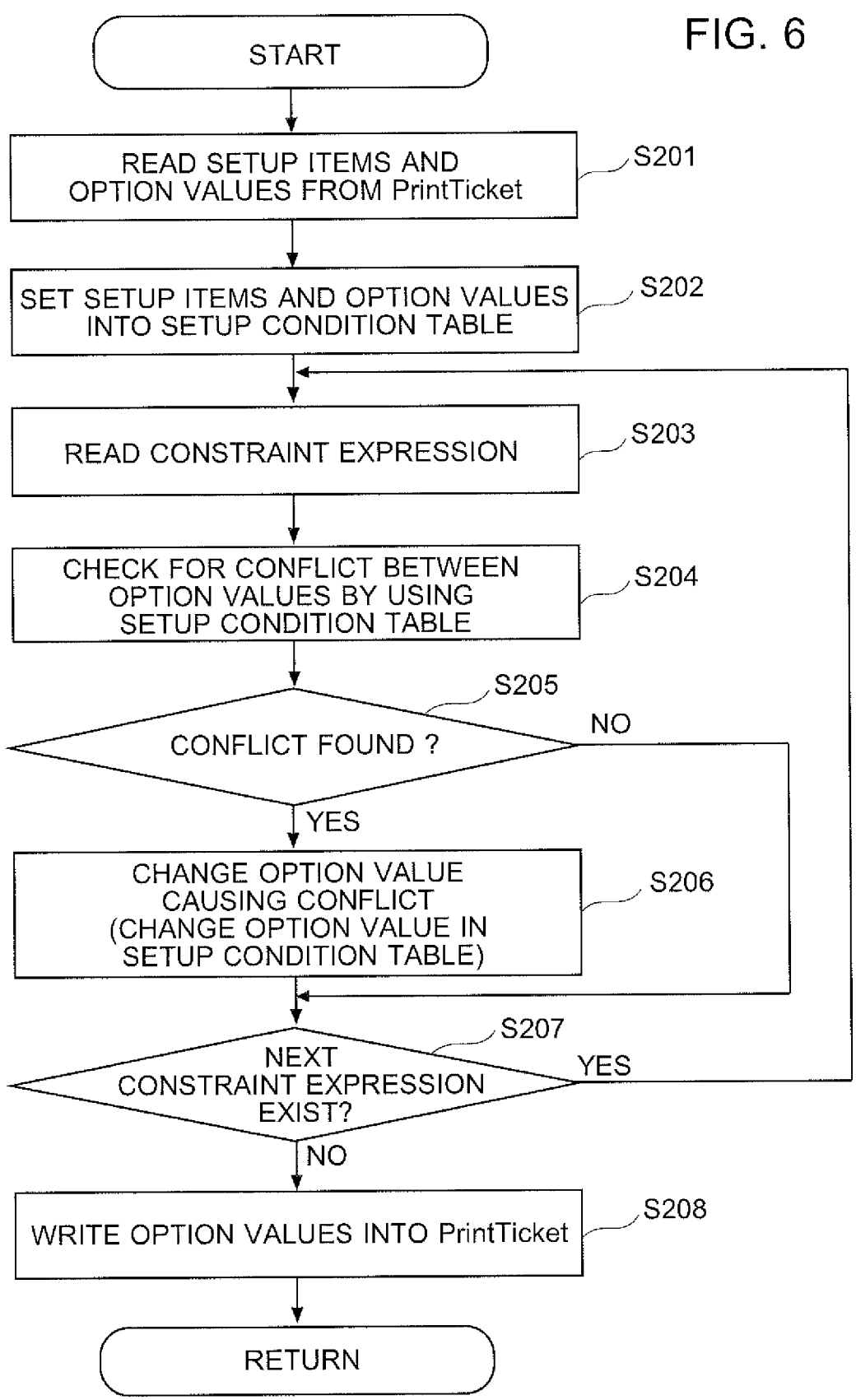
FIG. 6 is a flowchart illustrating prohibition processing (process of checking for a conflict between option values) of a computing device relating to one embodiment of the present invention.

In order to describe the above-mentioned embodiments in more detail, description will be given to a non-transitory computer-readable storage media each storing a printer driver and print control methods of the printer driver pertaining to one example of the present invention with reference to FIGS. 1 to 16. FIG. 1 is a diagram schematically illustrating a constitution of a printing system of the present example. FIG. 2 is a block diagram illustrating a constitution of a computing device of the present example. FIG. 3 is a functional block diagram of a computing device of the present example. FIG. 4 illustrates an example a GPD file. Each of FIGS. 5 and 6 is a flowchart illustrating prohibition processing of a computing device of the present example. Each of FIGS. 7 and 8 illustrates an example of PrintTicket of the present example. FIGS. 9A and 9B illustrate an example of a hash code table of the present example. FIGS. 10A to 10C illustrate an example of PrintTicket to which a hash value is added. FIG. 11 illustrates an example of a setup item list. Each of FIGS. 12 and 13 illustrates an example of a setup condition table. FIG. 14 is illustrates an example of a constraint expression. FIGS. 15A, 15B and 15C are diagrams for illustrating effects of control of the prohibition processing of the present example. FIG. 16 is a diagram schematically illustrating the prohibition processing of the present example.

As illustrated in FIG. 1, a printing system of the present example includes printer devices 10 which execute print processing according to print instructions, and a print instructing device (hereinafter, referred to as a computing device 20) which gives print instructions to the printer devices 10. The printer devices 10 and the computing device 20 are communicably connected together with a communication network such as a LAN (Local Area Network) and a WAN (Wide Area Network).

Printer devices 10 can be general printers and MFPs (Multi-Function Peripherals). Each of the printer devices 10 is configured to analyze print data sent from computing device 20, rasterize pieces of the print data corresponding to pages of a document to create image data for each of the pages, and print images based on the image data by using an image forming process such as an electrophotograpic process and an electrostatic printing process.

Computing device 20 can be a personal computer or a mobile device (such as a smart phone and a tablet terminal) which supports a Microsoft Windows operating system. Computing device 20 includes control section 21, storing section 22, communication interface (I/F) section 23, display section 24, and operating section 25, as illustrated in FIG. 2.

Control section 21 includes a CPU (Central Processing Unit) 21a and storage devices such as a ROM (Read Only Memory) 21b and a RAM (Random Access Memory) 21c. CPU 21a reads various programs stored in ROM 21b or storing section 22, and then, develops and executes the programs on RAM 21c, where the various programs include programs for controlling operations of computing device 20, an operating system (in the present example, Microsoft Windows operating system on which a version 4 printer driver can be executed), application programs and printer drivers for controlling printer devices 10 (in the present example, a version 4 printer driver for carrying out prohibition processing using a script language like JavaScript). The application programs, the printer driver core component and the print setup UT component will be described later.

Storing section 22 includes a memory device, such as a HDD (Hard Disk Drive), and stores various data including programs, document data and print data.

Communication interface section 23 is composed of a device such as a NIC (Network Interface Card) and a modem, and is configured to perform data communication with printer devices 10 through a wireless network or a wired network.

Display section 24 includes a device such as a LCD (Liquid Crystal Display), and displays screens of application programs and a print setup screen created by the print setup UI component.

Operating section 25 includes devices such as a mouse, a keyboard and a touch sensor formed on display section 24, and allows a user to perform operations such as creating documents and setting print features of printer devices 10.

FIG. 3 is a block diagram illustrating functions and sections realized by control section 21 of computing device 20. Control section 21 of computing device 20, when CPU 21a executes application programs 30, printer driver core component 40, and print setup UI component 50, serves the functions of these programs.

Application program 30 is a program to be executed on an operating system (for example, Microsoft Office which can run on Windows operating systems) for creating document data to be printed. The operating system and application 30, when being executed, give printer driver core component 40 an instruction of prohibition processing which determines whether a conflict of settings of a print feature occurs, in steps of print processing.

Printer driver core component 40 is a program to be executed on an operating system, and when being executed, causes the control section 21 to serve as a printer driver core section which sends a print instruction to printer device 10 in cooperation with application program 30 and print setup UI component 50. The printer driver core component 40 includes GPD file 41, UserPropertybag (user property bag) 42, configuration processing section 43, JavaScript constraint section 44, rendering processing section 45 and print filter 46, and when being executed, causes the control section 21 to serve their functions.

GPD file 41 is one of configuration files and includes definition of various print features of printer device 10. UserPropertybag 42 is a region for storing data, such as a hash code table, a setup item list, setup condition table and constraint expressions which will be described later. Configuration processing section 43 performs the following processing. Configuration processing section 43 creates PrintCapabilities (print capability information) based on GPD file 41, where PrintCapabilities includes descriptions of setup items associated with the print features which can be set by users and descriptions of option values available for each setup item associated with the printing features and both descriptions are described in a structured language like XML. Configuration processing section 43 further creates PrintTicket (print setup information) which includes descriptions of an option value for each setup item, chosen by a user from among the option values described in PrintCapabilities, by using a structured language like XML. Configuration processing section 43 further invokes JavaScript constraint section 44.

JavaScript constraint section 44 processes PrintTicket and/or PrintCapabilities to handle a conflict between settings (setup items and/or setup options) associated with the print features. For example, under the situation that a combination of a setting of a first feature (for example, an imposition feature) and a setting of a second feature (for example, a punching feature) is invalid, JavaScript constraint section 44 modifies one of the settings to be consistent with the other. JavaScript constraint section 44 is capable of editing PrintTicket and/or PrintCapabilities by using JavaScript. Rendering processing section 45 converts print instructions sent from application program 30 into descriptions in language (for example, PDL or Page Description Language) which can be interpreted by printer device 10. Print filter 46 edits instructions for drawing and edits print control commands, in a rendering process.

Print setup UI component 50 is a program to be executed on an operating system and when being executed, causes the control section 21 to serve as a print setup UI section. Print setup UI component 50 includes PT/PC processing section 51 and UI processing section 52, and when being executed, causes the control section 21 to serve their functions.

PT/PC processing section 51 processes (or interprets) PrintTicket and/or PrintCapabilities obtained from printer driver core component 40 (printer driver core section). UI processing section 52 creates print setup screen 60 on the basis of PrintTicket and/or PrintCapabilities interpreted by the PT/PC processing section 51, and controls display section 24 to display the print setup screen 60.

FIG. 4 illustrates an example of a description of GPD file 41. In GPD file 41, each print feature is defined at "*Feature:" shown in FIG. 4, and an option value of each print feature are defined at "*Option:", as a child element of the "*Feature". In this example, the GPD file 41 includes definition of print features, "Orientation", "PaperSize", and "Stapling".

In the present example, there will be given a description that GPD file 41 is used as a configuration file to define print features. Alternatively, the prohibition processing method of the present example is applicable similarly to the situation that a PPD (PostScript Printer Description) file is used as the configuration file.

Hereinafter, operations of the printer driver (control of prohibition processing) of the present example will be described. CPU 21a reads a printer driver stored in ROM 21b or storing section 22, and then, develops and executes the printer driver on RAM 21c, to realize processes of the steps illustrated in the flowcharts of FIGS. 5 and 6. In the present example, there is provided a description of processing carried out by validatePrintTicket( ) as a function in JavaScript Constraint section 44 to be invoked by configuration processing section 43. The validatePrintTicket( ) is a function to be invoked when an operating system and application 30 has determined that check of PrintTicket is needed, and invoked at a time when print setting is changed or when print processing is carried out. On carrying out print processing, the function is invoked several times.

At the beginning of the prohibition processing, a check for a conflict of option values may be carried out immediately. However, if no changes have been made in settings of print features, there is no need to the check. Therefore, in the present example, the following processing is performed firstly so as to furthermore reduce the prohibition processing time. That is, the processing includes: calculating information, such as a hash value and a checksum, from PrintTicket which is made in a condition that there is no conflict between option values, and storing the information, where a hash value is a fixed-length pseudo-random number which is obtained by a certain calculation procedure based on original data so as to represent characteristics of the original data, and the checksum is a value obtained by dividing original data into several blocks, assuming a piece of data in each block as a numerical value, and calculating the sum of the numerical values of all the blocks. "Sameness check information" or "identification information" is a general term of a hash value and a checksum. The processing further includes: calculating sameness check information from the PrintTicket at a beginning of prohibition processing for the PrintTicket concerned, and skipping a check for a conflict between option values if there is no difference between the stored sameness check information and the calculated sameness check information.

Concretely, first, JavaScript constraint section 44 calculates sameness check information (a hash value, in the present example) from PrintTicket to be checked (S101). FIG. 7 illustrates PrintTicket (1) which is an example of PrintTicket to be checked. PrintTicket (1) includes descriptions of print settings so as to set "JobCopiesAllDocument" to "1" (which means to create one copy of the original), set "PageMediaSize" to "ISOA3" (which means to set the paper size to A3), set "PageInputBin" to "Tray4" (which means to select the paper feed tray "Tray 4"), and set "Document- Staple" to "StapleDualLeft" (which means to staple paper sheets at two points at the left-hand side).

Next, JavaScript constraint section 44 obtains a list of hash values which obtained in previous check processes from a hash code table which was stored in advance in UserPropertybag 42 (S102). FIG. 9A illustrates an example of the hash code table, and the hash code table stores hash codes (hash values) calculated from PrintTicket which is made in a condition that there is no conflict between the option values. In this example, the hash code table stores two hash values of "1d43fe3c" and "4f3d274d". The hash code table may store only the hash value calculated from PrintTicket to be checked. However, the number of combinations of setup items of print features and corresponding option values are limited, and it can be considered that there is a low probability that a conflict arises in settings associated with print features in the PrintTicket to be checked even under the condition that a hash value of the PrintTicket to be checked agree with hash values calculated from another PrintTicket. Therefore, in the hash code table, hash values calculated from all the PrintTickets which were checked may be described.

Next, JavaScript constraint section 44 determines whether the hash value calculated in S101 exists in the list of has values obtained in S102 (S103). If the hash value calculated from PrintTicket (1) exists in the list of hash values (YES in S103), JavaScript constraint section 44 ends the prohibition processing because there is no conflict caused in settings of print features in the PrintTicket (1) and there is no need to carry out the process of checking for a conflict between option values.

On the other hand, if the hash value calculated from PrintTicket (1) does not exist in the list of hash values (NO in S103), JavaScript constraint section 44 carries out the process of checking for a conflict between option values (S104) because JavaScript constraint section 44 cannot know whether a conflict is caused in settings associated with print features in the PrintTicket (1). This step is one of features of the present example and the details will be described below.

Next, JavaScript constraint section 44 calculates a hash value from a checked PrintTicket in which the conflict was corrected (S105). FIG. 8 illustrates PrintTicket (2) which is an example of PrintTicket which was checked. In PrintTicket (2) in FIG. 8, the name property of the Value node defined for "PageInputBin" was changed to "AutoSelect" and the name property of the Value node defined for "DocumentStaple" was changed to "None" (see the broken-line boxes in FIG. 8).

Next, JavaScript constraint section 44 stores the hash value calculated in S105 into the hash code table (S106). Each of FIG. 9A and FIG. 9B illustrates an example of the hash code table. The hash value ("6a5b341f" in this example) calculated from checked PrintTicket (2) is added into the original hash code table shown in FIG. 9A and modified as illustrated in FIG. 9B (see the broken-line boxes in FIG. 9B).

As described above, by skipping the process of checking for a conflict of option values under the condition that the hash value calculated from PrintTicket to be checked agrees with any one of hash values which were calculated in previous check processes and are described in the hash code table, the prohibition processing time can be shortened and the time to the start time of print processing can be shortened.

While the above is a description about an example that a hash code table stores a hash value calculated from Print-Ticket to be checked, the PrintTicket to be checked may store the hash value calculated from itself. For example, as illustrated in FIG. 10A, a hash value ("1d43fe3c" in this example) is calculated from PrintTicket to be checked, and then, the hash value is written at a certain location (for example, at the end) of the PrintTicket in the XML format. Next, when prohibition processing to be carried out on the PrintTicket is requested again, another hash value is calculated by using the PrintTicket excluding the former hash value, and the obtained hash value (the latter hash value) and the former hash value added to the PrintTicket are compared with each other. If these hash values agree with each other (see FIG. 10B), a process of checking for a conflict between option values is skipped because there is caused no conflict of settings of print features in the PrintTicket. On the other hand, if these hash values do not agree with each other (see FIG. 10C), the obtained (latter) hash value ("4f3d274d" in this example) is added to a certain location. After that, if prohibition processing to be carried out on the PrintTicket to be checked is requested again, another hash value is calculated by using the PrintTicket excluding the hash values, and the calculated hash value and the plural hash values added to the PrintTicket are compared with each other. If the currently calculated hash value agrees with any one of the plural hash values, a process of checking for a conflict between option values is skipped. As shown by the above description, by adding a hash value or hash values to PrintTicket, the prohibition processing time can be shortened and the time period to the start time of print processing can be shortened, similarly to the above-described example using a hash code table.

Next, a process of checking for a conflict between option values as one of features of the present example will be described. As described in the above, PrintTicket was repeatedly read each time the process of checking for a conflict between option values was carried out in a conventional method. The method needs to read PrintTicket which is relatively large in data size, further needs to read PrintTicket including a part which is unnecessary for the check process, and further needs to read PrintTicket for each of constraint expressions which will be described later. Therefore, it takes time for the processing. In view of that, the present example employs the following process of checking for a conflict between option values. The process includes extracting setup items and corresponding option values which are needed for a check for a conflict between option values, from PrintTicket; creating check data which is relatively small in data size, on the basis of the setup items and the option values; and checking the check data for a conflict between option values. Hereinafter, the process of checking for a conflict between option values will be described with referring to the flowchart of FIG. 6 and the schematic diagram of FIG. 16.

First, JavaScript constraint section 44 interprets PrintTicket to be checked (PrintTicket (1) illustrated in FIG. 7) and reads setup items and option values described in the PrintTicket (S201).

Next, JavaScript constraint section 44 creates check data (which is assumed as a setting condition table in this example) on the basis of a setup item list which was previously created (S202 and A in FIG. 16). FIG. 11 illustrates an example of a setup item list which lists names of setup items to be used in constraint expressions. Using the setup item list, JavaScript constraint section 44 sets one or more items of SETUP ITEM and one or more items of OPTION VALUE into the setup condition table. FIG. 12 illustrates setup condition table (1) which is an example of a setup condition table, and the setup table is created on the basis of PrintTicket (1) illustrated in FIG. 7 and the setup item list illustrated in FIG. 11. SETUP ITEM corresponds to a name property of Feature node or Parameterinit node described in PrintTicket. OPTION VALUE corresponds to a value of Value node or Option node described in PrintTicket. CHANGED in the table represents a change condition flag which is set to true when an option value in the table is changed or replaced. In the present example, the setup item list has been prepared in advance. Alternatively, JavaScript constraint section 44 may define one or more setup items to be used in a constraint expression which will be described below, and read information corresponding to the one or more setup items which has been defined, from PrintTicket. Further, while the present example uses the setup condition table as check data, the check data may have an arbitrary structure other than a table structure. The check data can be described in an arbitrary data format, such as a XML format similarly to PrintTicket, and a text format. Making the check data described in a text format, can reduce the size of the check data and make a process of reading the check data easy, which may be advantageous because it can furthermore shorten the prohibition processing time.

Next, JavaScript constraint section 44 reads constraint expressions for checking for a conflict between option values associated with print features, one line at a time (S203). FIG. 14 illustrates an example of constraint expressions. Concretely, in the constraint expressions, the first line indicates that when the option "A3" is selected for the feature of page size and the option "Tray4" is selected for the feature of paper feed tray, the selected option value for the feature of paper feed tray is constrained to be "AutoSelect". The second line indicates that when the option "A3" is selected for the feature of page size and the option "StapleDualLeft" (stapling at two points at the left hand side) is selected for the feature of stapling, the selected option value for the feature of stapling is constrained to be "None".

Next, JavaScript constraint section 44 carries out a check for a conflict between option values, by using the setup condition table (1) illustrated in FIG. 12 and a constraint expression read in S203 (S204 and B in FIG. 16). Concretely, JavaScript constraint section 44 checks whether the combination of the setup items and the option values described in setup condition table (1) shown in FIG. 12 agrees with the combination of the setup items and the option values defined in the constraint expression. In the conventional prohibition processing, such a check was carried out by using PrintTicket, which is relatively larger in data size, and a constraint expression, and it took longer time for the check process. However, in the present example, a check for a conflict between option values is carried out by using setup condition table (1), which is relatively smaller in data size, and a constraint expression, which can reduce the period of time needed for the check for a conflict between option values.

If JavaScript constraint section 44 has found a occurrence of a conflict between option values as a result of the check in S204 (YES in S205), JavaScript constraint section 44 changes the option value according to the constraint expression to solve the conflict, and replaces the option value in the table, which is set for the setup item causing the conflict, with another option value which does not cause a conflict between option values (S206 and C in FIG. 16). FIG. 13 illustrates setup condition table (2) which is an example of a setup condition table after the check for a conflict between option values has been completed. In the illustrated table, the option value of the setup item "psk:PageInputBin" is changed into "psk:AutoSelect", and the change condition flag "CHANGED" is set to "true". Further, the option value of the setup item "psk:DocumentStaple" is changed into "psk:None", and the change condition flag "CHANGED" is set to "true" (see the broken-lined box in FIG. 13). If JavaScript constraint section 44 has not found an occurrence of a conflict of option values (NO in S205), JavaScript constraint section 44 does nothing and the flow skips to S207.

Next, JavaScript constraint section 44 determines whether a next constraint expression exists (S207), the flow returns to S203 if a next constraint expression exists, and the similar processing is repeated until JavaScript constraint section 44 does not find an unused constraint expression illustrated in FIG. 14. When the determining process has been carried out on all the constraint expressions, JavaScript constraint section 44 writes option values for each of which the conflict has been solved, into PrintTicket (S208 and D in FIG. 16). Concretely, by using setup condition table (2) illustrated in FIG. 13, JavaScript constraint section 44 writes the option value of the setup item for which the change condition flag "CHANGED" is set to "true". FIG. 8 illustrates PrintTicket (2) which is an example of PrintTicket where the option values have been overwritten. In PrintTicket (2), similarly to setup condition table (2), the option value of the setup item "psk:PageInputBin" is changed into "psk:AutoSelect", and the option value of the setup item "psk:DocumentStaple" is changed into "psk:None".

As described above, a process of checking for a conflict between option values includes: reading setup items listed in a setup item list which has been created in advance, and option values, from PrintTicket; creating a setup condition table which is relatively small in data size; and carrying out the check for a conflict between option values, by using the setup condition table. Thereby, a period of time needed for the process of checking for a conflict between option values can be reduced greatly in comparison with a conventional method, because the conventional method uses PrintTicket, which is relatively large in data size and includes an unnecessary part for the check for a conflict of option values, and reads the entire of PrintTicket in a process of checking for a conflict between option values, for each of constraint expressions.

Hereinafter, there will be given a description about effects of a reduction of time period of prohibition processing using two kinds of control, where one is a control (which is an optional control to be carried out as occasion demands) to compare hash values and skip the a process of checking for a conflict between option values as illustrated in FIG. 5 and the other is a control (which is one of features of the present example) to carry out the process of checking for a conflict between option values, by using a setup condition table as illustrated in FIG. 6. Each of FIGS. 15A to 15C is a table for comparing measurement results of periods of time of the processing in the condition that the above control is applied to the processing and the condition that the above control is not applied to the processing. Each of the measurement results is an average value obtained by measuring the above-described period of time five times in each condition and calculating an average of the measured values. The measurement conditions are the same as those of Table 1. There are two kinds of test data as measurement targets, document "SPO3P_AC.pdf" composed of one page and document "J9.doc" composed of five pages. As the measurement environment, Windows 8 Pro, Intel Core i5-2400 CPU 3.10 GHz (INTEL CORE is a registered trademark of Intel Corporation), 8.00 GB memory, and 400 GB (remaining 100 GB) HDD were used; and the documents were processed by using applications, Adobe Reader 11.0.3 (ADOBE and READER are either registered trademarks of Adobe Systems) and Microsoft Word 2010.

FIG. 15A is a table showing periods of time of the processing under the condition that only the control to compare hash values and skip the process of checking for a conflict between option values is applied to the print processing, and the processing does not include the control to carry out the check process by using a setup condition table (that is, the processing includes reading PrintTicket and carrying out the check for a conflict between option values, for each constraint expression). As can be seen from FIG. 15A, employing the control to compare hash values and skipping the check process, can reduce the prohibition processing time by 30% to 40%, and can reduce the period of the processing time until the completion of the print data creation by 17% to 20%, in comparison with the case the control is not applied to the processing.

FIG. 15B is a table showing periods of time of the processing under the condition that only the control to carry out the process of checking for a conflict between option values, by using a setup condition table is applied to the print processing, and the processing does not include the control to compare hash values and skip the check process (that is, in the processing, the check process is carried out every time when the prohibition processing is demanded). As can be seen from FIG. 15B, employing the control to carry out the check process by using a setup condition table, can reduce the prohibition processing time by about 40%, and can reduce the period of time until the completion of the print data creation by 20% to 22%, in comparison with the case that just the control to compare hash values and skipping the check process is applied to the processing.

FIG. 15C is a table showing periods of time of the processing under the condition that both of the control to compare hash values and skip the check process and the control to carry out the check process by using a setup condition table are applied to the processing. As can be seen from FIG. 15C, employing both of the controls can reduce the prohibition processing time by about 60%, and can reduce the period of time until the completion of the print data creation by 30% to 40%, in comparison with the case that none of those two controls are applied to the processing. It is found that a combination of those two controls exhibits remarkable effects of reduction of period of the processing time.

The scope of the present invention is not limited to the aforementioned embodiments and examples. Disclosed configurations of the aforementioned printer driver and the disclosed print control method of the printer driver can be varied by a skilled person without departing from the spirit and scope of the invention.

For example, the description about a version 4 printer driver was given in the above example, but the aforementioned printer driver and the method may be applied similarly to an arbitrary printer driver which uses a script language like JavaScript.

What is claimed is:

1. A non-transitory computer-readable storage medium storing a printer driver to be executed in a computing device which gives print instructions to a printer device, the printer driver, when being executed by a processor of the computing device, causing the computing device to perform prohibition processing comprising:

obtaining setup items associated with print features of the printer device and option values set for the setup items from PrintTicket, to create check data by using the setup items and the option values;

checking the check data for a setup item causing a conflict between option values; and in response to finding a setup item causing a conflict between option values, replacing an option value in the PrintTicket, which is set for the setup item causing the conflict with the option values among the setup items in the PrintTicket, with another option value which does not cause a conflict between option values, wherein the check data is smaller in data size than the PrintTicket, wherein the checking the check data includes replacing an option value in the check data, which is set for the setup item causing the conflict with the option values among the setup items in the check data, with another option value which does not cause a conflict between option values, and adding information indicating that the option value has been replaced into the check data, and the replacing the option value in the PrintTicket, includes referring to the information added to the check data, and replacing the option value in the PrintTicket, which is set for the setup item causing the conflict with the option values among the setup items in the PrintTicket, with the option value in the check data which does not cause a conflict between option values.

2. The non-transitory computer-readable storage medium of claim 1, wherein the obtaining the setup items and the option values from the PrintTicket includes, obtaining, from the PrintTicket, only one or more predetermined setup items among the setup items in the PrintTicket and one or more option values set for the one or more predetermined setup items.

3. The non-transitory computer-readable storage medium of claim 1, wherein the check data is checked by using a constraint expression, and the obtaining the setup items and the option values from the PrintTicket includes, obtaining, from the PrintTicket, only one or more setup items among the setup items in the PrintTicket and one or more option values set for the one or more setup items, where the one or more setup items is referred to by the constraint expression.

4. The non-transitory computer-readable storage medium of claim 3, wherein the check data is checked by using a plurality of constraint expressions, and the checking the check data includes checking the check data for a setup item causing a conflict between option values by using each of the constraint expressions.

5. The non-transitory computer-readable storage medium of claim 1, wherein the PrintTicket is described in an Extensible Markup Language format, and the check data is described in a text format.

6. The non-transitory computer-readable storage medium of claim 1, wherein the printer driver is a version 4 printer driver to be executed on a Windows (a registered trademark) operating system.

7. The non-transitory computer-readable storage medium of claim 6,
wherein each of the setup items in the PrintTicket corresponds to a Feature element or a Parameterinit element, and each of the option values in the PrintTicket corresponds to an Option element or a Value element.

8. The non-transitory computer-readable storage medium of claim 1,
wherein the prohibition processing further comprises:
before the obtaining the setup items and the option values from the PrintTicket, calculating first identification information to be used for identifying a plurality of pieces of information, by using the PrintTicket;
comparing the first identification information with second identification information previously calculated by using the PrintTicket made in a condition that there is no conflict between the option values in the PrintTicket;
upon the first identification information agreeing with the second identification information, skipping all the obtaining the setup items and the option values from PrintTicket, checking the check data, and the replacing the option value in the PrintTicket; and
upon the first identification information being different from the second identification information, performing all the obtaining the setup items and the option values from PrintTicket, checking the check data, and the replacing the option value in the PrintTicket.

9. The non-transitory computer-readable storage medium of claim 8,
wherein each of the first identification information and the second identification information is a hash value or a checksum.

10. The non-transitory computer-readable storage medium of claim 1,
wherein the obtaining includes:
creating a setup condition table as the check data in a text format based on a setup item list that lists the setup items; and
setting the setup items and the option values into the setup condition table.

11. A print control method of a printer driver to be executed in a computing device which gives print instructions to a printer device, the printer driver, when being executed by a processor of the computing device, causing the computing device to perform prohibition processing, the method comprising:
obtaining setup items associated with print features of the printer device and option values set for the setup items from PrintTicket, to create check data by using the setup items and the option values;
checking the check data for a setup item causing a conflict between option values; and
in response to finding a setup item causing a conflict between option values, replacing an option value in the PrintTicket, which is set for the setup item causing the conflict with the option values among the setup items in the PrintTicket, with another option value which does not cause a conflict between option values,
wherein the check data is smaller in data size than the PrintTicket,
wherein the checking the check data includes
replacing an option value in the check data, which is set for the setup item causing the conflict with the option values among the setup items in the check data, with another option value which does not cause a conflict between option values, and
adding information indicating that the option value has been replaced into the check data, and
the replacing the option value in the PrintTicket, includes
referring to the information added to the check data, and
replacing the option value in the PrintTicket, which is set for the setup item causing the conflict with the option values among the setup items in the PrintTicket, with the option value in the check data which does not cause a conflict between option values.

12. The method of claim 11,
wherein the obtaining the setup items and the option values from the PrintTicket includes, obtaining, from the PrintTicket, only one or more predetermined setup items among the setup items in the PrintTicket and one or more option values set for the one or more predetermined setup items.

13. The method of claim 11,
wherein the check data is checked by using a constraint expression, and
the obtaining the setup items and the option values from the PrintTicket includes, obtaining, from the PrintTicket, only one or more setup items among the setup items in the PrintTicket and one or more option values set for the one or more setup items, where the one or more setup items is referred to by the constraint expression.

14. The method of claim 11,
wherein the check data is checked by using a plurality of constraint expressions, and the checking the check data includes checking the check data for a setup item causing a conflict between option values by using each of the constraint expressions.

15. The method of claim 11,
wherein the PrintTicket is described in an Extensible Markup Language format, and the check data is described in a text format.

16. The method of claim 11,
wherein the printer driver is a version 4 printer driver to be executed on a Windows (a registered trademark) operating system.

17. The method of claim 16,
wherein each of the setup items in the PrintTicket corresponds to a Feature element or a Parameterinit element, and each of the option values in the PrintTicket corresponds to an Option element or a Value element.

18. The method of claim 11,
wherein the prohibition processing further comprises:
before the obtaining the setup items and the option values from the PrintTicket, calculating first identification information to be used for identifying a plurality of pieces of information, by using the PrintTicket;
comparing the first identification information with second identification information previously calculated by using the PrintTicket made in a condition that there is no conflict between the option values in the PrintTicket;
upon the first identification information agreeing with the second identification information, skipping all the obtaining the setup items and the option values from PrintTicket, checking the check data, and the replacing the option value in the PrintTicket; and
upon the first identification information being different from the second identification information, performing all the obtaining the setup items and the option values from PrintTicket, checking the check data, and the replacing the option value in the PrintTicket.

19. The method of claim 18,
wherein each of the first identification information and the second identification information is a hash value or a checksum.

* * * * *